United States Patent [19]
Stopher

[11] Patent Number: 5,880,532
[45] Date of Patent: Mar. 9, 1999

[54] WIND-UP POWER SOURCE WITH SPRING MOTOR AND VEHICLE INCORPORATING SAME

[75] Inventor: Robert D. Stopher, Isle, Minn.

[73] Assignee: Estate of Robert Stopher, Cedar, Minn.

[21] Appl. No.: 716,988

[22] Filed: Sep. 20, 1996

[51] Int. Cl.[6] .................................................. H02P 9/04
[52] U.S. Cl. .................. 290/1 E; 290/1 C; 310/12; 310/13
[58] Field of Search ............... 290/1 E; 180/165, 180/65 R; 362/192; 185/10; 310/12, 13

[56] References Cited

U.S. PATENT DOCUMENTS

| | | | |
|---|---|---|---|
| 1,484,493 | 2/1924 | Hargot | 290/1 E |
| 1,672,797 | 6/1928 | Amat et al. | 290/1 E |
| 3,099,402 | 7/1963 | Speck | 362/192 |
| 3,732,949 | 5/1973 | Williams | 185/40 |
| 3,861,487 | 1/1975 | Gill | 180/65 R |
| 3,945,453 | 3/1976 | Black | 180/54 |
| 3,971,977 | 7/1976 | Hirt et al. | 322/61 |
| 3,986,580 | 10/1976 | Dennis | 185/9 |
| 4,075,545 | 2/1978 | Haberer | 322/61 |
| 4,254,843 | 3/1981 | Han et al. | 180/165 |
| 4,360,860 | 11/1982 | Johnson et al. | 362/192 |
| 4,523,261 | 6/1985 | West | 362/192 |
| 4,632,205 | 12/1986 | Lewis | 180/165 |
| 4,701,835 | 10/1987 | Campagnuolo et al. | 362/192 |
| 5,327,065 | 7/1994 | Bruni et al. | 362/192 |
| 5,378,196 | 1/1995 | Pinch et al. | 472/119 |
| 5,590,741 | 1/1997 | Storms | 185/10 |

*Primary Examiner*—Nestor Ramirez
*Assistant Examiner*—Elvin G. Enad
*Attorney, Agent, or Firm*—Merchant, Gould, Smith, Edell, Welter & Schmidt, P.A.

[57] ABSTRACT

A spring motor utilizes a series arrangement of alternately-wound coiled springs coupled to one another at common ends. The spring motor is coupled to a generator through a gear mechanism to provide a portable and reusable supply of electric power. In addition, the spring motor may be used in a vehicle to recapture wasted energy due to lost momentum during braking. The spring motor is coupled to a winding mechanism for driving the spring motor in response to application of the vehicle's brakes.

16 Claims, 7 Drawing Sheets

WIND-UP POWER SOURCE WITH SPRING MOTOR AND VEHICLE INCORPORATING SAME

FIELD OF THE INVENTION

The invention is generally directed to wind-up power sources for generating electrical and/or mechanical power. The invention is also generally directed to the use of such sources in capturing wasted energy from a vehicle in motion, among other applications.

BACKGROUND OF THE INVENTION

With energy costs continuing to rise, an ever-present need has developed for less expensive and more powerful reusable energy sources. As an example, wind-up power sources, which are typically wound manually by an operator, have been developed to provide inexpensive and portable mechanical or electrical power. Hand-cranked portable lights and radios have been developed that couple a handle to a generator for providing power to run an electrical device. However, many of such devices have no mechanism for storing mechanical power, so the handle must be turned continuously during use of the device.

Other designs have been developed to store mechanical energy for later use, thereby enabling a device to be used without continuous manual power. For example, U.S. Pat. No. 3,099,402 to Speck discloses a portable flashlight in which a spring motor having a pair of spiral or coiled springs drives a generator for lighting a bulb and charging a storage battery. A handle coupled to a pawl mechanism is used to wind the spring motor. Once wound up, the spring motor operates for a period of time to charge the battery and light the bulb.

However, the coiled springs in Speck are wound in the same direction and are housed in individual driving wheels which in effect couple the outer end of the first spring to the inner end of the second. A complex series of specifically designed gears and housings couple the springs to one another and to the generator. It has been found that this arrangement is unduly large and expensive given the additional mechanical components needed to couple the coiled springs together. Further, the two coiled springs in the disclosed arrangement are limited in the amount of power they can supply, thereby necessitating frequent rewinding.

Therefore, a significant need has continued to exist for a spring motor offering longer life in a smaller, less complex and less expensive package.

Another focus in the area of reusable energy sources is related to recapturing wasted energy in vehicles and the like. For example, wind-responsive systems have been developed to run a generator while a vehicle is moving. In addition, momentum-responsive systems may utilize a flywheel which is coupled to a vehicle's axles during coasting or braking to power a generator in response to vehicle momentum. In another system, relative movement of components (e.g., in an automobile's suspension) may be stored in a spring motor to subsequently power a generator. While all of these systems may recapture some wasted energy, a need nonetheless exists for improved recapture of wasted energy in a vehicle to thereby increase the efficiency of the vehicle.

SUMMARY OF THE INVENTION

The present invention addresses these and other problems associated with the prior art in providing a spring motor which utilizes a series arrangement of alternately-wound coiled springs coupled to one another at common ends (i.e., inner end-to-inner end and outer end-to-outer end). By alternately winding the coiled springs and joining their common ends, a series arrangement of several coiled springs may be provided in a compact, inexpensive arrangement offering greater efficiency and longer life than heretofore has been possible. The preferred spring motor may also be coupled to a generator to provide a portable and reusable supply of electric power. Moreover, the couplings between springs may be modular in design, thereby permitting standard components to be assembled in different fashions to satisfy different power requirements.

The present invention addresses additional problems associated with the prior art in providing a vehicle having a spring motor coupled to a winding mechanism which is driven in response to application of the vehicle's brakes; thereby recapturing wasted energy in the form of the vehicle's lost momentum during braking. The spring motor may be coupled to a generator to charge the vehicle's batteries and/or to power electrical devices on the vehicle. In addition, a slip clutch, similar to that utilized on automobile air conditioner compressors, may be utilized to couple the winding mechanism to a vehicle axle or other moving component of the vehicle during braking.

Therefore, in accordance with one aspect of the invention, there is provided an apparatus, which includes a plurality of coiled springs coupled in a series arrangement, with each coiled spring counter-wound relative to an adjacent coiled spring in the series arrangement, the plurality of coiled springs including first and last coiled springs, the first and last coiled springs each having a free end; a winding coupler joined to the free end of the first coiled spring and rotatable about a common axis with the first coiled spring to wind the series arrangement of coiled springs; and a drive coupler joined to the free end of the last coiled spring and rotatable by the series arrangement of coiled springs about a common axis with the last coiled spring.

In accordance with an additional aspect of the invention, there is provided an apparatus which includes a spring motor and an electric generator. The spring motor includes a plurality of coiled springs coupled in a series arrangement, with each coiled spring counter-wound relative to an adjacent coiled spring in the series arrangement, the plurality of coiled springs including first and last coiled springs, the first and last coiled springs each having a free end, the spring motor further including a rotatable winding coupler secured to the free end of the first coiled spring for winding the series arrangement of coiled springs, and a rotatable drive coupler secured to the free end of the last coiled spring and driven by the series arrangement of coiled springs. The electric generator includes a drive shaft driven by the drive coupler, the generator outputting an electrical signal in response to rotation of the drive shaft by the drive coupler.

According to a further aspect of the invention, there is provided a vehicle including brakes for stopping the vehicle. The vehicle includes a spring motor having a winding coupler for winding the spring motor, and a drive coupler driven by the spring motor; and a winding mechanism, coupled to the winding coupler, for winding the spring motor in response to application of the vehicle brakes; whereby momentum of the vehicle is captured in the spring motor during braking.

These and other advantages and features, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described preferred embodiments of the invention.

DETAILED DESCRIPTION OF THE PREFERRED EMBODIMENTS

Figure 1:
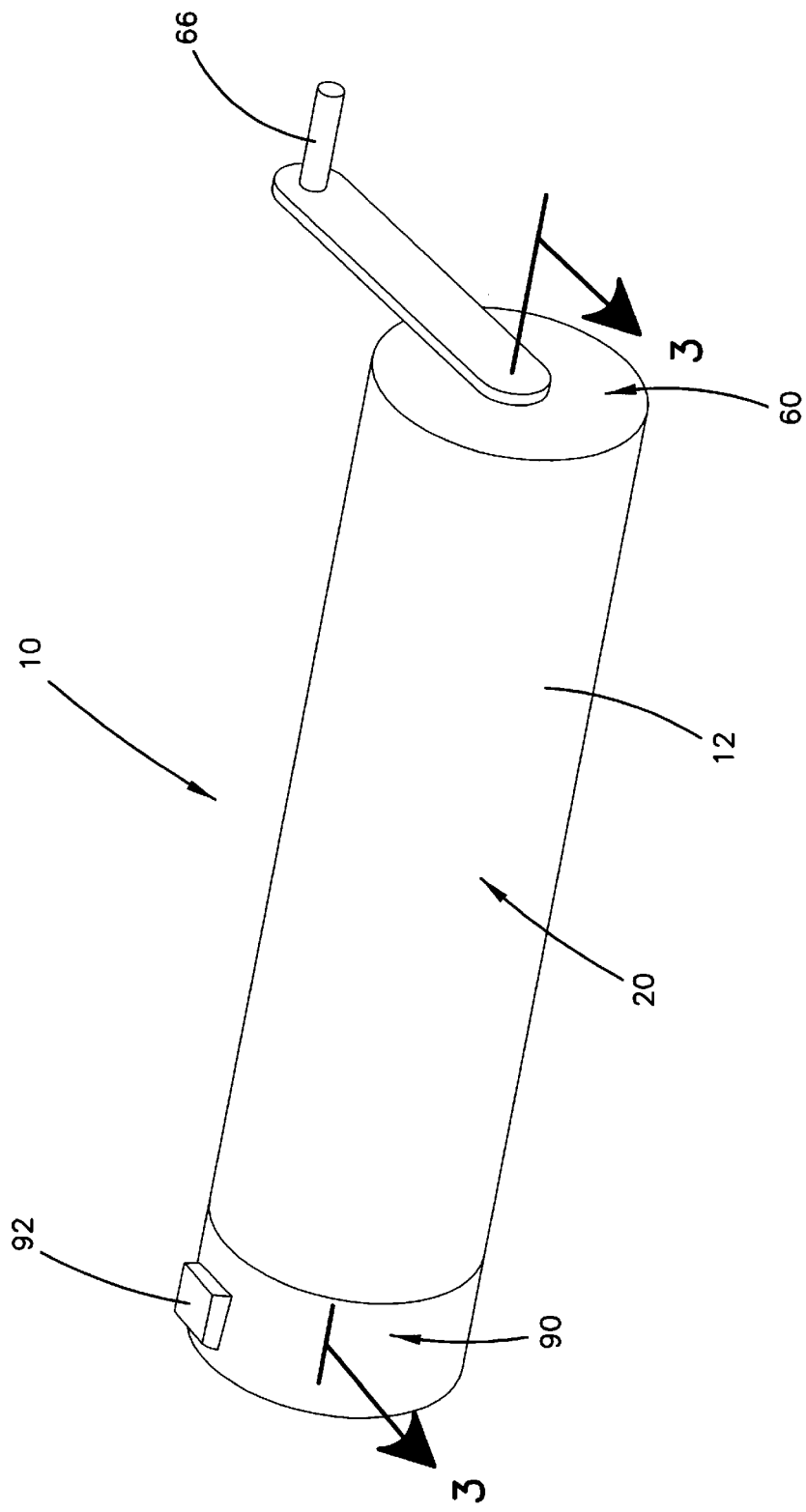
FIG. 1 is a perspective view of a preferred wind-up power source consistent with the principles of the present invention.
Figure 2:
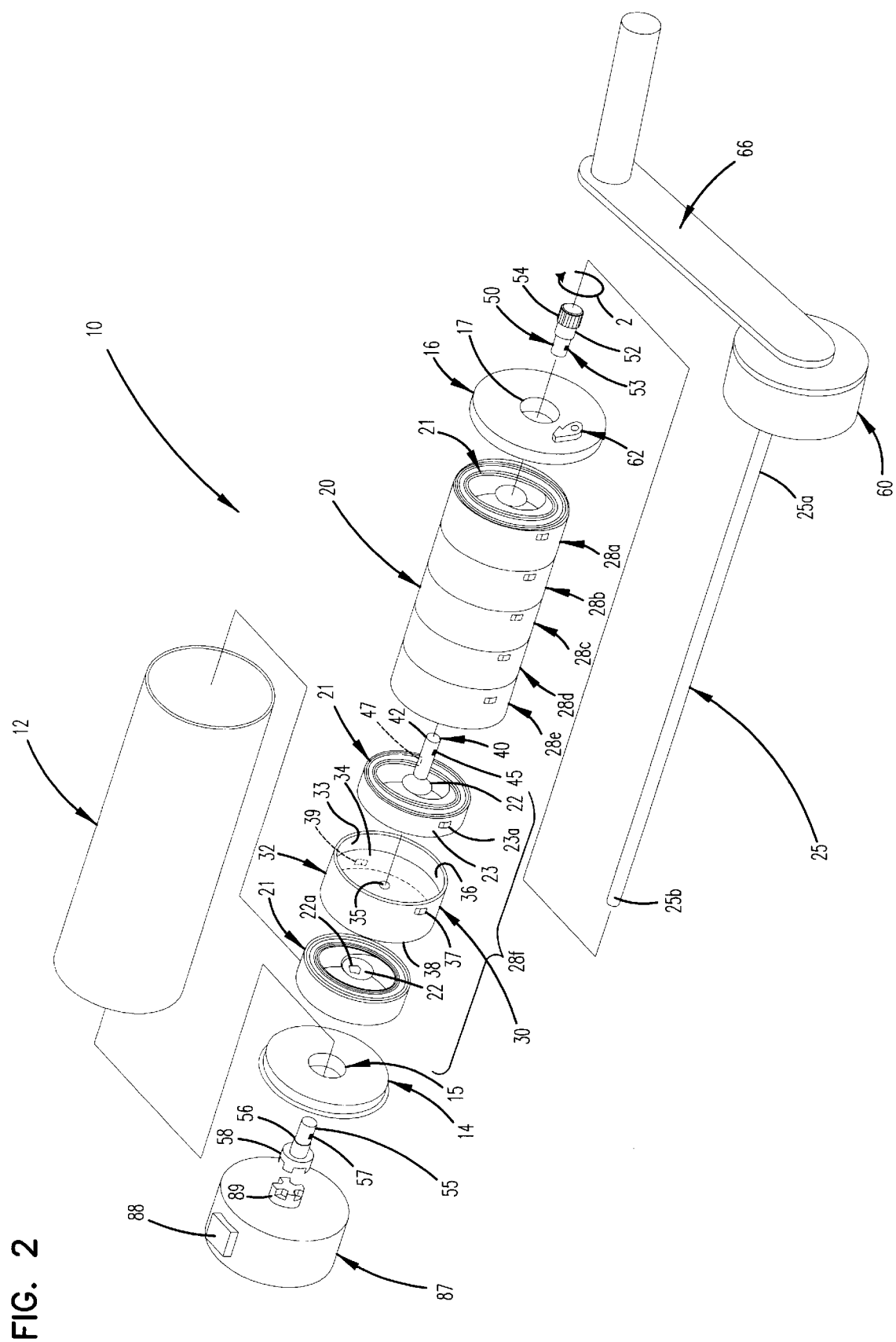
FIG. 2 is a partially-exploded perspective view of the preferred wind-up power source of FIG. 1.

Turning to the Drawing, wherein like numbers denote like parts throughout the several views, FIGS. 1 and 2 show a preferred wind-up power source or apparatus 10 consistent with the principles of the present invention. Apparatus 10 generally includes a housing 12 with end caps 14, 16 which encloses a spring motor 20 that is driven by a winding mechanism 60 having a handle 66. An optional brake 87 is coupled to a drive coupler 55 to selectively permit rotation thereof to supply rotational power. A support shaft 25, having a winding end 25a and a drive end 25b, defines a common axis for the spring motor about which its other components are mounted.

Spring motor 20 includes a series arrangement of counter-wound coiled springs 21 wound about a support shaft 25 and coupled at their common ends. Each spring includes an inner end 22 and an outer end 23. Inner end 22 preferably includes an engagement slot or aperture 22a, while outer end 23 preferably includes an engagement slot or aperture 23a, for engaging with suitable couplers to form the series arrangement of springs.

By "counter-wound", what is meant is that each coiled spring is wound in an opposite direction from the spring(s) immediately adjacent the spring in the series arrangement. By "coupled at common ends", what is meant is that adjacent coiled springs are mechanically coupled at either their inner ends 22 or their outer ends 23.

Various mechanisms can be used to mechanically couple the coiled springs together at their common ends. In the preferred embodiment, outer couplers 30 are used to couple the outer ends of pairs of coiled springs to form "spring groups" (designated at 28a–f), and inner couplers 40 are used to couple together the inner ends of the coiled springs from adjacent spring groups.

Spring group 28f is broken out into its primary components to illustrate the couplings between springs 21. Spring groups 28a–e are configured in a similar manner. Spring group 28f as shown includes a pair of springs 21 coupled by an outer coupler 30. Spring 21 proximate winding end 25a of shaft 25 is wound clockwise from its outer to inner ends (when viewed from winding end 25a of shaft 25), while spring 21 proximate drive end 25b of shaft 25 is wound counter-clockwise, such that the series arrangement may be wound through a clockwise rotation of winding mechanism 60 (i.e., in the direction of arrow 2).

Coupler 30 includes an annular flange 32 having an inner surface 33 and circumscribing a disk 34 having a central aperture 35 that receives shaft 25. A pair of chambers 36, 38 are formed on opposite sides of coupler 30, each for housing one of coiled springs 21.

Figure 3:
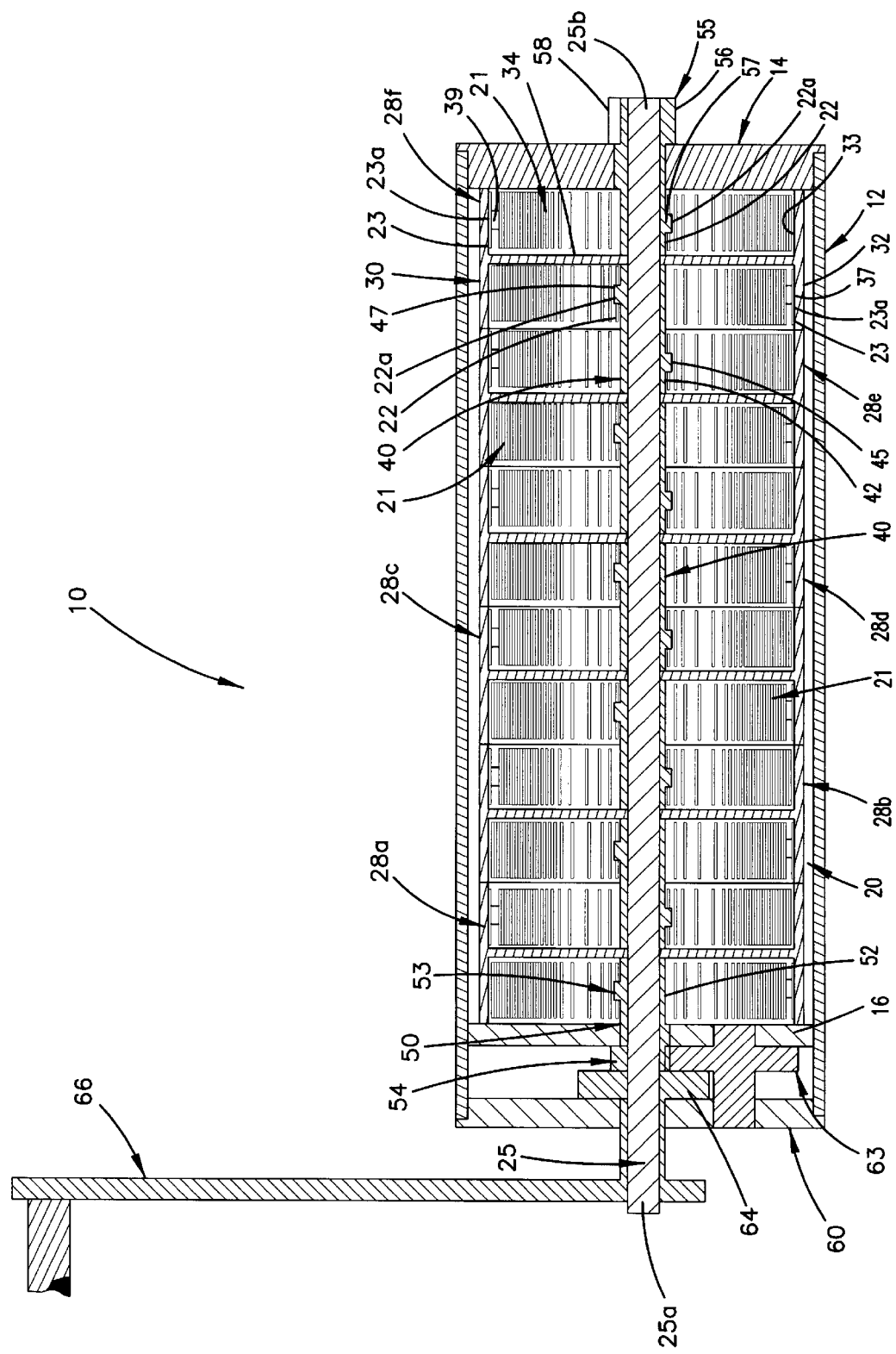
FIG. 3 is a cross-sectional view showing the engagement between the coiled springs and inner and outer couplers, taken along line 3—3 of FIG. 1, but without the optional brake shown coupled to the drive coupler.

As best shown in FIG. 3, a pair of tabs 37, 39 are formed on inner surface 33 of annular flange 32, each disposed in one of chambers 36, 38, and each preferably facing in an opposite tangential direction. The outer ends 23 of springs 21 include slots 23a that engage tabs 37, 39 to secure the springs within outer couplers 30.

Returning to FIG. 2, spring group 28f is coupled to spring group 28e by an inner coupler 40, which includes a sleeve 42 that is received on shaft 25. As best shown in FIG. 3, a pair of tabs 45, 47, disposed on sleeve 42, engage slots 22a in the inner ends 22 of coiled springs 21. Tabs 45, 47 preferably have engaging surfaces that face in opposite tangential directions from one another. In addition, inner coupler 40 is preferably shorter than or the same length as outer coupler 30 along the axis of support shaft 25, which permits adjacent outer couplers 30 to lie directly opposite one another with a minimum amount of spacing therebetween, thereby minimizing the overall length of spring motor 20.

Shaft 25 in the preferred embodiment does not turn in operation, but merely acts as a structural member for supporting and aligning the various couplers in spring motor 20. Because it transmits no torque, however, the structural requirements of shaft 25 are significantly reduced, thereby permitting a lighter stock to be used compared to a typical crankshaft. In addition, the design of the springs and couplers has been found to minimize internal stresses, thereby allowing the use of relatively light-weight structural components for the various couplers in spring motor 20.

In the preferred embodiment, six spring groups with a total of twelve ⅜" wide coiled springs are utilized in the series arrangement of springs. Free ends are defined at the inner ends 22 of the first and last springs 21 in the series arrangement. It should be appreciated that the number and size of springs 21 may be varied depending upon the particular power requirements of a given application. However, given that springs 21, outer couplers 30 and inner couplers 40 may be provided as standardized components, a modular system is possible whereby any number of springs may be coupled together to supply the particular torque and duration requirements of an application.

Returning to FIG. 2, a winding coupler 50 is coupled to the free inner end of the first coiled spring 21 in the series arrangement. Coupler 50 includes a sleeve 52 received on shaft 25, and a tab 53 for engaging the inner end 22 of coiled spring 21 (see FIG. 3). A gear 54 on winding coupler 50 engages a pawl mechanism 62 mounted to end cap 16 that permits winding coupler 50 to rotate only in a winding direction (designated by arrow 2), and thereby permit tension to be stored in spring motor 20. End cap 16 also includes a journal 17 for supporting winding end 25a of shaft 25. In some applications, it may be desirable to include a pawl release mechanism to permit reverse rotation of winding coupler 50 and thereby quickly release tension from spring motor 10.

As shown in FIG. 3, winding mechanism 60 includes handle 66 coupled to a gear 64, which is in turn coupled to gear 54 on winding coupler 50 through a compound idler gear 63, thereby forming an input speed increasing mechanism. Gears 54, 63 and 64 are sized relative to one another to increase the rotational velocity of winding coupler 50 relative to handle 66, thereby permitting faster winding of spring motor 20. The use of gearing to increase the winding speed of winding mechanism 60 is not required, however.

Returning to FIG. 2, a drive coupler 55 is coupled to the free inner end of the last coiled spring 21 through a tab 57 disposed on a sleeve 56. Drive coupler 55 is received and supported by journal 15 in end cap 14. A keyed member 58 engages a cooperative keyed member 89 on brake 87 to transmit torque to an output shaft of brake 87 (not shown in FIG. 2). Brake 87 is preferably a locking mechanism which, in response to depression of button 88, selectively permits or restricts rotation of the output shaft, in effect operating as an on-off switch for spring motor 20. In many applications brake 87 may not be required or desired, however, since it may be detrimental to keep springs 21 in tension for extended periods of time.

Rotation of handle 66 therefore imparts a clockwise rotation to winding coupler 50 which transmits torque to the first coiled spring 21, which in turn transmits torque to the first outer coupler 30, then to the second coiled spring 21, then to the first inner coupler 40, etc. The last coiled spring 21 in the series arrangement then transmits torque to drive coupler 55 and finally to the output shaft of brake 87.

Figure 4:
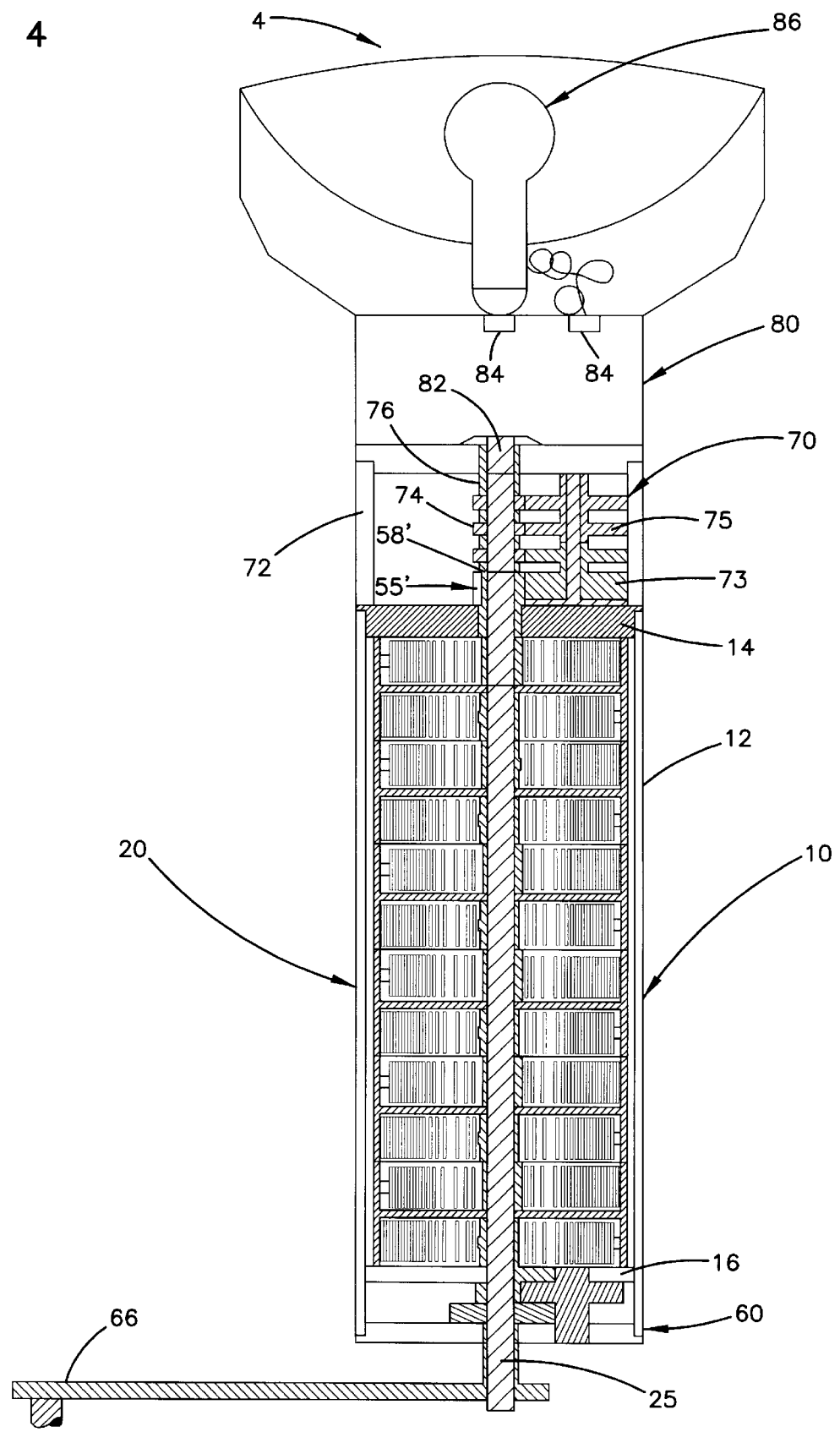
FIG. 4 is a partial cross-sectional view of a flashlight incorporating the preferred wind-up power source of FIG. 1.

Wind-up power source 10 may be used in a wide variety of applications to provide a reusable source of mechanical and/or electrical power. As an example of providing a source of electrical power, FIG. 4 illustrates a wind-up flashlight 4 incorporating the preferred wind-up power source 10. In this embodiment, a drive coupler 55' having a gear 58' is utilized on spring motor 10 to drive a gear mechanism 70 coupled to an electric generator 80. Gear mechanism 70 preferably includes a series of compound idler gears 73, 74 and 75, housed within housing 72, which mechanically couple drive coupler 55' to a gear 76 coupled to a drive shaft 82 of generator 80. Gear mechanism 70 preferably operates as a gear reducer to slow the velocity of drive shaft 82 relative to drive coupler 55', and thereby increase the output torque of spring motor 10. The preferred gear reduction is 30:1, although different gear mechanisms may be utilized to modify the torque and speed output of spring motor 10 to optimize the use of the spring motor in different applications. Moreover, gear mechanism 70 may not be required in some applications.

Electric generator 80 includes a pair of output terminals 84 which output an electric current in response to rotation of drive shaft 82. It may also be desirable to include a speed governor on drive shaft 82 to limit the rotational speed thereof and thereby prolong the run time of spring motor 10. In the preferred embodiment, generator 80 is a No. 23 DC generator available from Transcoil, which has 15 0.0015–0.002 inch windings, and which provides 100 mA of current at 6 volts with a drive shaft rotational speed of under 100 RPM. Other generator designs may be used for different applications.

Figure 5:
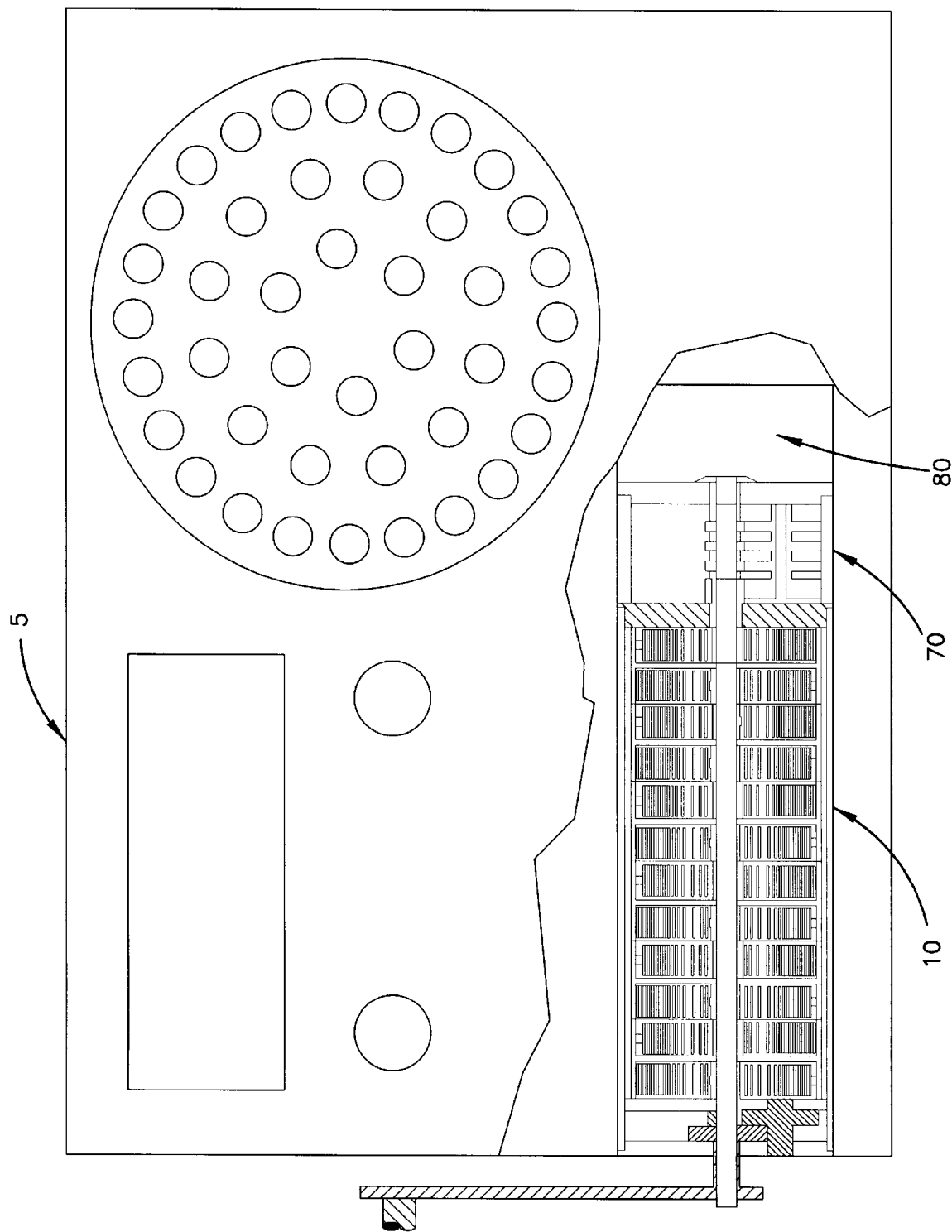
FIG. 5 is a partial cross-sectional view of a radio incorporating the preferred wind-up power source of FIG. 1.

Output terminals 84 are coupled to a bulb 86. Of course, other electrically-powered devices may be coupled to the output terminals, such as radio 5 shown in FIG. 5. In fact, it has been found that the preferred arrangement is capable of powering a small radio for over an hour before rewinding is required.

Wind-up power source 10 may be used to power other electric devices, e.g., lamps, lanterns, radios, televisions, mobile computers, communications devices such as telephones, cellular phones, walkie talkies, scanners, etc., among others. Moreover, wind-up power source 10 may be used to charge batteries coupled to any of the above devices in addition to or in lieu of powering components in the devices. It is also contemplated that the wind-up power supply may be configured as a backup power supply, e.g., it could be provided with universal terminals that could be plugged in to run any electrical device when the batteries wear out or when a power outage occurs. Other possible applications will be apparent to one skilled in the art.

Figure 6:
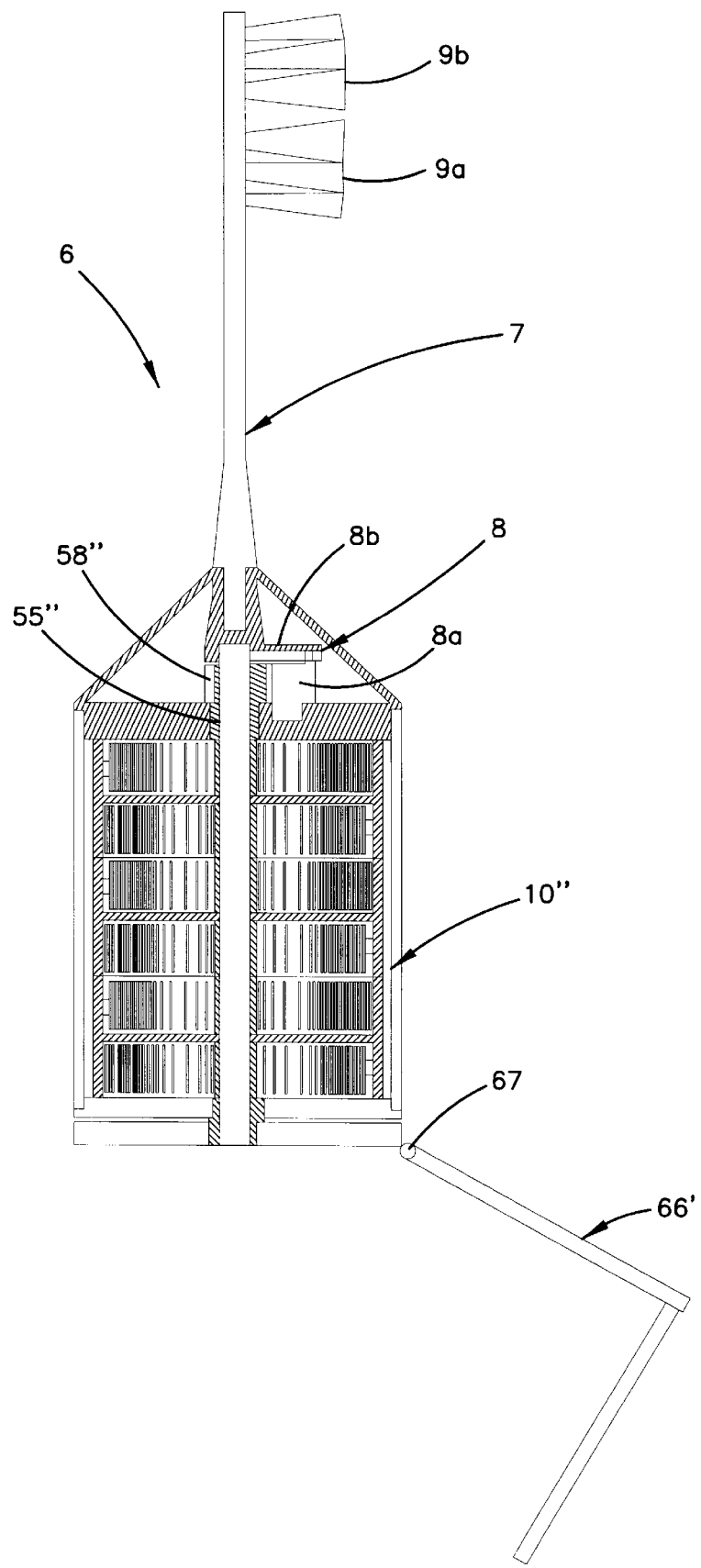
FIG. 6 is a partial cross-sectional view of a toothbrush incorporating the preferred wind-up power source of FIG. 1.

As an example of use of the preferred wind-up power source to provide mechanical power, FIG. 6 illustrates a toothbrush 6 utilizing a six spring wind-up power source 10" to rotate two sets of bristles 9a, 9b in opposite directions through a gear actuator 8. Gear actuator 8 includes a series of gears 8a, 8b that are driven by a gear 58" on a drive coupler 55". A removable toothbrush member 7 includes suitable gearing and shafts to transmit the torque from wind-up power source 10" to bristle sets 9a, 9b. Conventional toothbrushes exist which provide rotation of sets of bristles in this manner using an electric motor, and thus, the gearing and mechanical coupling required to rotate the bristle sets in response to rotation of drive coupler 55' is within the skill of the ordinary artisan. As is also shown in FIG. 6, it may be desirable to provide a more compact assembly by hinging handle 66' with a hinge 67 such that the handle may be pivoted flush with wind-up power source 10" when not in use.

Wind-up power source 10" may be used to power other mechanical device, e.g., toys, kitchen appliances, and grill rotisseries, among others. Other suitable applications will be apparent to one skilled in the art.

Another preferred application of the invention is in recapturing wasted energy in the form of lost momentum of a decelerating vehicle. For example, as shown in FIG. 7, a vehicle 100 includes brakes 102, a brake pedal 104, an engine 106, a transmission 108, a pair of axles 110, 112, and a battery 114.

Vehicle 100 is shown as an automobile powered by an internal combustion engine. However, it should be apparent that vehicle 100 may be practically any type of moving vehicle, particularly those having brakes. Examples include, but are not limited to, internal combustion or electric powered automobiles, trucks, motorcycles, fork lifts, utility trucks, wheel chairs, personal mobility devices, robots, pallet movers, golf carts, etc., as well as other human powered vehicles such as bicycles.

The present invention operates in this application generally by utilizing the momentum of a moving vehicle during braking to drive a wind-up power source for charging on-board batteries and/or for providing electrical and/or mechanical power to on-board devices.

Figure 7:
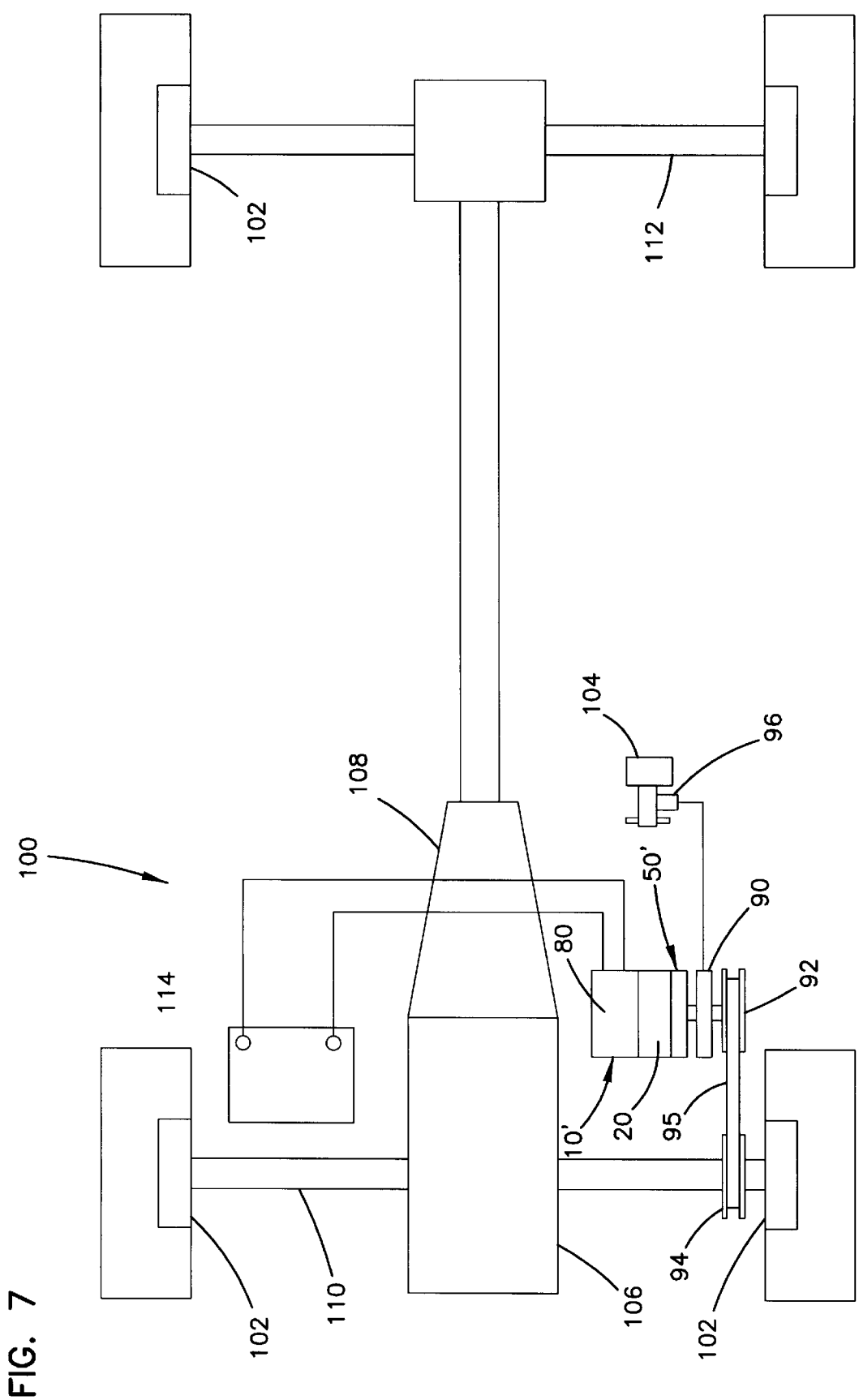
FIG. 7 is a functional block diagram of a vehicle incorporating the preferred wind-up power source of FIG. 1.

As shown in FIG. 7, a wind-up power source 10' is coupled to the front axle 110 of vehicle 100 through a pair of pulleys 92, 94 coupled through a belt 95. Power source 10' may alternatively be coupled to the transmission, to the rear axle, or to any other component of the vehicle which moves as the vehicle moves. Moreover, in certain applications a separately driven wheel could be used to drive power source 10'.

Power source 10' includes the preferred spring motor 20 coupled to the preferred electric generator 80 discussed above. However, it should be appreciated that other spring motor and generator designs may be used in the alternative, particularly should different mechanical and/or electrical output characteristics be desired.

An alternate winding mechanism 50', including a suitable pawl mechanism (not shown separately), couples spring motor 20 to pulley 92. Mechanism 50' also preferably includes an electrically-controlled slip clutch 90 such as the type used on typical automotive air conditioning compressors, e.g., a centrifugal slip clutch available from Ford Motor Co. Other mechanisms for selectively coupling spring motor 20 to a moving component of vehicle 100, including gears, pulleys, chains, etc., may also be used. Moreover, a wheel or pulley could be moved in and out of contact with a moving component on vehicle 100 to be selectively driven. It may also be desirable to include an additional mechanism to prevent spring motor 20 from being over-wound, e.g., through slipping whenever the tension exceeds a predetermined amount, or through deactivating the slip clutch.

Slip clutch 90 is controlled via a control signal provided by a control switch 96 to couple spring motor 20 to axle 110 whenever the brakes of vehicle 100 are applied. In the preferred embodiment, switch 96 is a contact switch which closes when brake pedal 104 has been depressed to a predetermined point. It should be appreciated that other control switches, e.g., hydraulic pressure switches, surge (momentum) switches, accelerometers, etc., may also be used to sense when the brakes are applied.

Generator 80 is shown coupled directly to battery 114 for recharging the same, as well as for providing additional power to run components on the vehicle, similar to the alternator of a conventional vehicle. Alternative electric circuits, e.g., incorporating a voltage regulator, etc., may also be used. In addition, an electric circuit separate from the main circuits of the vehicle may be used. In general, any mechanically or electrically powered component may be coupled to wind-up power source 10' to recapture energy lost during braking.

In operation, whenever brakes 102 are applied, switch 96 engages slip clutch 90 such that axle 110 drives wind-up power supply 10' to wind up spring motor 20 contained therein. Subsequently, spring motor 20 drives generator 80 to supply power to the vehicle. Spring motor 20 is wound whenever the brakes are applied, yet, as long as the motor has not completely unwound, it continues to generate power regardless of whether the brakes are currently applied. This provides a significant advantage over conventional systems where only a generator is used, since the wind-up power source is able to run even when the brakes are not applied, or when the vehicle is at rest. This may even permit, for example, the battery to be charged when the vehicle is stopped and unoccupied, among other advantages.

Therefore, it should be appreciated that the invention provides significant advantages in providing an inexpensive, compact and reusable source of power. As various modifications may be made to the preferred embodiments without departing from the spirit and scope of the invention, however, the invention lies in the claims hereinafter appended.

What is claimed is:

1. An apparatus, comprising:
   (a) a plurality of coiled springs coupled in a series arrangement, with each coiled spring counter-wound relative to an adjacent coiled spring in the series arrangement, the plurality of coiled springs including first and last coiled springs, the first and last coiled springs each having a free end;
   (b) a winding coupler joined to the free end of the first coiled spring and rotatable about a common axis with the first coiled spring to wind the series arrangement of coiled springs;
   (c) a drive coupler joined to the free end of the last coiled spring and rotatable by the series arrangement of coiled springs about a common axis with the last coiled spring; and
   (d) a non-rotatable support shaft upon which the series arrangement of coiled springs, the winding coupler and the drive coupler are rotatably mounted.

2. The apparatus of claim 1, wherein each coiled spring includes an inner end and an outer end, said inner and outer ends including slots formed therein, the apparatus comprising a plurality of outer couplers, rotatably mounted about the support shaft, for joining the outer ends of a plurality of pairs of adjacent coiled springs, each outer coupler comprising:
   (a) an annular flange having an inner surface extending parallel to the support shaft; and
   (b) a pair of tabs spaced axially from one another on the inner surface of the flange and respectively engaging the slots in the outer ends of the respective pair of adjacent coiled springs;
   and wherein the annular flanges of adjacent pairs of said outer couplers are disposed closely adjacent each other.

3. The apparatus of claim 2, wherein each outer coupler further comprises a disk mounted within the annular flange and extending perpendicular thereto to define a pair of oppositely disposed chambers for respectively receiving the respective pair of adjacent coiled springs, with one of the pair of tabs disposed within each chamber, the disk defining a central aperture for receiving the support shaft.

4. The apparatus of claim 2, further comprising a plurality of inner couplers, rotatably mounted on the support shaft, for joining the inner ends of a plurality of second pairs of adjacent coiled springs, each inner coupler comprising:
   (a) a sleeve receiving the support shaft; and
   (b) a second pair of tabs spaced axially from one another on an outer surface of the sleeve and respectively engaging the slots in the inner ends of the respective second pair of adjacent coiled springs.

5. The apparatus of claim 1, further comprising a winding mechanism coupled to the winding coupler, the winding mechanism including a pawl mechanism for inhibiting rotation of the winding coupler in a direction which releases tension from the series arrangement of coiled springs.

6. An apparatus, comprising:
   (a) a spring motor including a plurality of coiled springs coupled in a series arrangement, with each coiled spring counter-wound relative to an adjacent coiled spring in the series arrangement, the plurality of coiled springs including first and last coiled springs, the first and last coiled springs each having a free end, the spring motor further including a rotatable winding coupler secured to the free end of the first coiled spring for winding the series arrangement of coiled springs, and a rotatable drive coupler secured to the free end of the last coiled spring and driven by the series arrangement of coiled springs;
   (b) a non-rotatable support shaft rotatably supporting the series arrangement of coiled springs; and
   (c) an electric generator including a drive shaft driven by the drive coupler, the generator outputting an electrical signal in response to rotation of the drive shaft by the drive coupler.

7. The apparatus of claim 6, wherein each coiled spring includes an inner end and an outer end, said inner and outer ends including slots formed therein, and the apparatus further comprising:

(a) a plurality of outer couplers, rotatably mounted about the support shaft, for joining the outer ends of a plurality of first pairs of adjacent coiled springs; and (b) a plurality of inner couplers, rotatably mounted on the support shaft, for joining the inner ends of a plurality of second pairs of adjacent coiled springs;

and wherein the annular flanges of adjacent pairs of said outer couplers are disposed closely adjacent each other.

8. The apparatus of claim 7, wherein each outer coupler comprises:

(a) an annular flange having an inner surface extending parallel to the support shaft; and (b) a disk mounted within the annular flange and extending perpendicular thereto to define a pair of oppositely disposed chambers for respectively receiving the respective first pair of adjacent coiled springs, the disk defining a central aperture for receiving the support shaft; and (c) a pair of tabs respectively disposed in the pair of chambers on the inner surface of the flange and respectively engaging the slots in the outer ends of the respective first pair of adjacent coiled springs.

9. The apparatus of claim 7, wherein each inner coupler comprises:

(a) a sleeve receiving the support shaft; and (b) a pair of tabs spaced axially from one another on an outer surface of the sleeve and respectively engaging the slots in the inner ends of the respective second pair of adjacent coiled springs.

10. The apparatus of claim 7, wherein the series arrangement of coiled springs includes twelve coiled springs, with the first coiled spring coupled to a second coiled spring through one of said outer couplers to form a first spring group, and with each subsequent group of two coiled springs coupled through additional said outer couplers to form additional spring groups, wherein each spring group is coupled to adjacent spring groups through one of said inner couplers, and wherein the first coiled spring is wound clockwise such that tension is applied to the series arrangement of springs via clockwise rotation of the winding coupler.

11. The apparatus of claim 6, further comprising a gear mechanism coupling the drive coupler to the drive shaft of the generator.

12. The apparatus of claim 11, wherein the gear mechanism provides a 30:1 gear reduction between the drive coupler and the drive shaft.

13. The apparatus of claim 6, further comprising a winding mechanism coupled to the winding coupler, the winding mechanism including a pawl mechanism for inhibiting rotation of the winding coupler in a direction which releases tension from the series arrangement of coiled springs.

14. The apparatus of claim 13, wherein the winding mechanism comprises a handle and an input speed increasing mechanism, coupled between the handle and the winding coupler, for increasing the rotational speed of the winding coupler relative to the handle and thereby reducing the winding time of the spring motor.

15. The apparatus of claim 6, further comprising a brake, coupled to the drive coupler, for selectively restricting rotation of the drive coupler.

16. An apparatus, comprising:

a plurality of coiled springs coupled in a series arrangement, with each coiled spring counter-wound relative to an adjacent coiled spring in the series arrangement, the plurality of coiled springs including first and last coiled springs, the first and last coiled springs each having a free end, and wherein each coiled spring includes an inner end and an outer end, said inner and outer ends including slots formed therein;

a winding coupler joined to the free end of the first coiled spring and rotatable about a common axis with the first coiled spring to wind the series arrangement of coiled springs;

a drive coupler joined to the free end of the last coiled spring and rotatable by the series arrangement of coiled springs about a common axis with the last coiled spring;

a non-rotatable support shaft upon which the series arrangement of coiled springs, the winding coupler and the drive coupler are rotatably mounted;

a plurality of outer couplers rotatably mounted about the non-rotatable support shaft, for joining the outer ends of a plurality of pairs of adjacent coiled springs, each outer coupler having an annular flange with an inner surface extending parallel to the support shaft and a pair of tabs spaced axially from one another on the inner surface of the flange and respectively engaging the slots in the outer ends of the respective pair of adjacent coiled springs, and wherein the annular flanges of adjacent pairs of said outer couplers are disposed closely adjacent each other; and a plurality of inner couplers rotatably mounted on the non-rotatable support shaft, for joining the inner ends of a plurality of second pairs of adjacent coiled springs, each inner coupler including a sleeve receiving the non-rotatable support shaft and a second pair of tabs spaced axially from one another on an outer surface of the sleeve and respectively engaging the slots in the inner ends of the respective second pair of adjacent coiled springs, wherein a length of each sleeve along the non-rotatable support shaft is less than or equal to a width of each annular flange along the non-rotatable support shaft.

* * * * *